United States Patent
Husted et al.

(10) Patent No.: US 8,284,817 B2
(45) Date of Patent: Oct. 9, 2012

(54) MEASURING RECEIVED SIGNAL STRENGTH ON NEIGHBORING FREQUENCIES OF A CHANNEL WITH INTERFERENCE IN A WIRELESS DEVICE

(75) Inventors: Paul J. Husted, San Jose, CA (US); Praveen Dua, Cupertino, CA (US); Douglas J. Kogan, Sandy, UT (US)

(73) Assignee: QUALCOMM Atheros, Inc., San Jose, CA (US)

( * ) Notice: Subject to any disclaimer, the term of this patent is extended or adjusted under 35 U.S.C. 154(b) by 337 days.

(21) Appl. No.: 12/827,803

(22) Filed: Jun. 30, 2010

(65) Prior Publication Data

US 2012/0002704 A1   Jan. 5, 2012

(51) Int. Cl.
*H04B 1/00* (2006.01)
(52) U.S. Cl. ........ 375/137; 375/147; 375/316; 375/346; 375/348
(58) Field of Classification Search .......... 375/137, 375/147, 316, 346, 348
See application file for complete search history.

(56) References Cited

U.S. PATENT DOCUMENTS

| | | | |
|---|---|---|---|
| 5,946,607 | A | 8/1999 | Shiino et al. |
| 6,373,909 | B2 | 4/2002 | Lindquist et al. |
| 6,665,355 | B1 | 12/2003 | Chen et al. |
| 6,680,928 | B1* | 1/2004 | Dent ............................. 370/342 |
| 6,801,585 | B1 | 10/2004 | Nguyen et al. |
| 7,103,316 | B1 | 9/2006 | Hall |
| 7,116,963 | B2 | 10/2006 | Suominen |
| 7,684,464 | B2 | 3/2010 | Linsky et al. |
| 7,711,027 | B2 | 5/2010 | Honda |
| 7,808,950 | B2 | 10/2010 | Kizu et al. |
| 8,036,165 | B2* | 10/2011 | Miyata et al. .................. 370/329 |
| 2002/0065060 | A1 | 5/2002 | Minnis et al. |
| 2002/0160734 | A1 | 10/2002 | Li et al. |
| 2003/0067359 | A1 | 4/2003 | Darabi et al. |
| 2003/0100286 | A1 | 5/2003 | Severson et al. |
| 2004/0063403 | A1 | 4/2004 | Durrant |
| 2005/0159109 | A1 | 7/2005 | Kivekas et al. |
| 2005/0191964 | A1 | 9/2005 | Hundal |
| 2005/0220219 | A1 | 10/2005 | Jensen |
| 2006/0013172 | A1 | 1/2006 | Ruuska et al. |
| 2006/0165032 | A1* | 7/2006 | Hamalainen et al. ......... 370/328 |
| 2007/0098118 | A1 | 5/2007 | Muhammad et al. |
| 2007/0190945 | A1* | 8/2007 | Lee et al. ..................... 455/63.1 |
| 2010/0291921 | A1 | 11/2010 | Ruuska et al. |

FOREIGN PATENT DOCUMENTS

WO   EP 1 404 072 A1   3/2004

OTHER PUBLICATIONS

Mitra et al. Digital Signal Processing: A Computer-Based Approach, The McGraw-Hill Companies, Inc, 1998, pp. (220-228). International Search Report for Application No. PCT/US2010/045047, mailed Mar. 16, 2011; 3 pages.

* cited by examiner

*Primary Examiner* — Ted Wang
(74) *Attorney, Agent, or Firm* — Bay Area Technology Law Group PC

(57) ABSTRACT

System and method for operating a wireless narrowband receiver. A signal may be received on a channel of the wireless narrowband receiver. At least a portion of the signal may be received from a first wireless narrowband transmitter. The wireless narrowband receiver may implement an adaptive frequency hopping algorithm. It may be determined if interference is present on the channel and one or more errors are detected in receiving the signal. In response to determining that interference is present on the channel and one or more errors are detected in receiving the signal, received signal strength of one or more neighboring frequencies of the channel may be measured, and the resulting measurements may be stored in a memory. The measurements may be used to determine interference sources interference on the channel.

22 Claims, 3 Drawing Sheets

MEASURING RECEIVED SIGNAL STRENGTH ON NEIGHBORING FREQUENCIES OF A CHANNEL WITH INTERFERENCE IN A WIRELESS DEVICE

CROSS-REFERENCE TO RELATED APPLICATION

U.S. patent application Ser. No. 12/016,955, titled "Hybrid Zero-IF Receiver", whose inventors are Paul J. Husted, Shahram Abdollahi-Alibeik, David J. Weber, and Soner Ozgur, which was filed Jan. 18, 2008, is hereby incorporated by reference as though fully and completely set forth herein.

FIELD OF THE DISCLOSURE

The present invention relates generally to wireless communication, and more particularly to measuring received signal strength on neighboring frequencies of a channel with interference in a wireless device.

DESCRIPTION OF THE RELATED ART

Wireless communication is being used for a plethora of applications, such as in laptops, cell phones, and other wireless communication devices ("wireless devices"). A number of different wireless communication protocols are currently in common use, some of which share a common transmission/reception band. For example, the unlicensed 2.4 GHz ISM frequency band is commonly used by IEEE 802.11 ("Wi-Fi") devices, BLUETOOTH™ devices (referred to herein as Bluetooth for convenience), and cordless telephones. If two or more devices (whether utilizing different protocols or utilizing the same protocol) attempt to transmit on the same channel, this will cause interference, with potentially adverse effects on reception of the data being transmitted.

Various techniques exist to avoid interference between devices. Bluetooth, for example, uses an adaptive frequency hopping technique to avoid noisy channels. A Bluetooth device will periodically perform a background scan to determine which channels are available and which are in use, and determine its frequency hopping algorithm accordingly. However, due to the inherently mobile nature of wireless devices, a channel that was previously available may become unavailable to a wireless device at any time. For example, if a wireless device enters an area in which another wireless device is using that channel, or another wireless device using that channel enters the area of the wireless device, interference may become present on a channel which previously was available. If a Bluetooth device is utilizing a channel subject to such "new" interference caused by a wireless wideband transmitter (such as a Wi-Fi device), it might be desirable to update the Bluetooth device's frequency hopping algorithm to avoid that channel. However, in other cases, for example if interference on a channel is caused by another wireless narrowband transmitter (such as another Bluetooth device), the interference on the channel may be transient and it may be desirable that the channel remain part of the Bluetooth device's frequency hopping algorithm.

Thus, it would be desirable for Bluetooth devices to be able to determine the source type of the interference. Currently, Bluetooth can determine a received signal strength indication (RSSI) for a channel with interference, but this doesn't indicate whether the source of the interference is a narrowband transmitter or a wideband transmitter. Bluetooth also is capable of performing background scans over its entire range of possible channels, but these tend to hurt performance and waste power, and aren't good at detecting sporadic traffic (such as Wi-Fi beacons), so it is preferable to use background scans relatively infrequently. Thus, improvements in the field are desirable.

SUMMARY OF THE INVENTION

Embodiments of the invention relate to a method for operating a wireless receiver. In some embodiments the wireless receiver may be a wireless narrowband receiver, such as a Bluetooth receiver. The method may be used, in some embodiments, by a wireless narrowband receiver which is attempting to receive a signal transmitted by a first wireless narrowband transmitter. In particular, in a situation in which the wireless narrowband receiver is unable to receive the signal from the first wireless narrowband transmitter without error because of interference (also referred to as noise) on a channel on which the signal propagates, the method may be used to determine if a source of interference on the channel is a wireless wideband transmitter or a second wireless narrowband transmitter. Such a determination may be useful in determining whether a channel should continue to be used, e.g., in a system that utilizes multiple channels, such as a Bluetooth system using an adaptive frequency hopping technique.

The method may be implemented by a wireless receiver, which, as noted above, may in some embodiments be a wireless narrowband receiver, such as a Bluetooth receiver. In some embodiments, the wireless receiver may include an antenna for receiving a signal, signal processing logic coupled to the antenna and configured to receive the signal from the antenna, and a memory coupled to the signal processing logic, e.g., for storing measurements made on the signal by the signal processing logic. According to various embodiments, the signal processing logic may be any of various types of logic, including analog logic, digital logic, a processor and memory (such as a CPU, DSP, microcontroller, etc.), an ASIC (application specific integrated circuit), an FPGA (field programmable gate array), or any combination of the above.

A signal may be received (e.g., by the antenna) on a channel of the wireless receiver. At least a portion of the signal may be received from a first wireless transmitter. The wireless receiver may in some embodiments be a wireless narrowband receiver that implements an adaptive frequency hopping algorithm; likewise in some embodiments the first wireless transmitter may be a wireless narrowband transmitter also implementing the adaptive frequency hopping algorithm and communicating with the wireless narrowband receiver. It may be determined (e.g., by signal processing logic) whether interference is present on the channel and one or more errors are detected in receiving the signal. According to various embodiments, the one or more errors could include not correlating the received signal, detecting a cyclic redundancy check (CRC) failure, or detecting a PHY error, among other possible errors.

In some embodiments, determining that interference is present on the channel may include determining that received signal strength on the channel is above a first threshold in combination with detection of the one or more errors. For example, these conditions may indicate that there may be interference on the channel, since despite what might otherwise be sufficient signal strength to correctly receive the signal, the one or more errors occurred in receiving the signal. It may thus be desirable to measure received signal strength of one or more neighboring frequencies of the channel. For example, received signal strength measurements of neighboring frequencies of the channel may provide an indication of whether there is interference present only within the channel, or if there is also interference present outside the channel. Thus, such measurements may be used to determine if the source of interference is only operating on a single channel (in which case the source may likely be a wireless narrowband transmitter) or if the source of interference is operating on multiple channels (in which case the source may likely be a wireless wideband transmitter).

Thus, in response to determining that interference is present on the channel and one or more errors are detected in receiving the signal, received signal strength of one or more neighboring frequencies of the channel may be measured. In some embodiments, the wireless receiver may include a rotator operable to rotate a measured frequency of the received signal; for example, the rotator may be operable to rotate a measured frequency of the received signal by a first frequency amount. Measuring the received signal strength of one or more neighboring frequencies of the channel may accordingly include, for each respective neighboring frequency of the one or more neighboring frequencies of the channel, rotating a measured frequency of the received signal (e.g., rotating the measured frequency of the received signal by the first frequency amount one or more times), thereby rotating the measured frequency to the respective neighboring frequency, and measuring the received signal strength of the respective neighboring frequency. In some embodiments, the wireless receiver may be capable of performing a frequency domain transform on the received signal; for example, the wireless receiver might implement a Fourier transform as part of its signal processing logic. Thus, in such embodiments, measuring received signal strength of the one or more neighboring frequencies of the channel may include applying a frequency domain transform to the received signal and measuring received signal strength of the one or more neighboring frequencies of the channel from the frequency domain transformed signal. It should be noted that in some embodiments, if interference is not present on the channel, or no errors are detected in receiving the signal, the received signal strength of neighboring frequencies may not be measured.

Once acquired, the measurements of received signal strength of the one or more neighboring frequencies may be stored in a memory, e.g., for use in determining if a source of interference on the channel is a wireless wideband transmitter or a wireless narrowband transmitter, as noted above. Determining a type of source of interference on a channel using the system and method described herein may be particularly useful to systems in which sources of interference may be categorized based on transmission bandwidth characteristics with reasonable accuracy. For example, on the 2.4 GHz band, on which Bluetooth and Wi-Fi are the most common transmitters, the method may enable a Bluetooth receiver (a wireless narrowband receiver) to quickly determine whether use of a channel with interference should be discontinued (e.g., if a wireless wideband transmitter using the channel is present, it is likely to be a persistent source of interference) or may continue to be used without expectation of errors during future use of the channel (e.g., if a second wireless narrowband transmitter using the channel is present, it is likely to be a transient source of interference).

BRIEF DESCRIPTION OF THE DRAWINGS

A better understanding of the present invention can be obtained when the following Detailed Description of the Embodiments is read in conjunction with the following drawings, in which.

Figure 1:
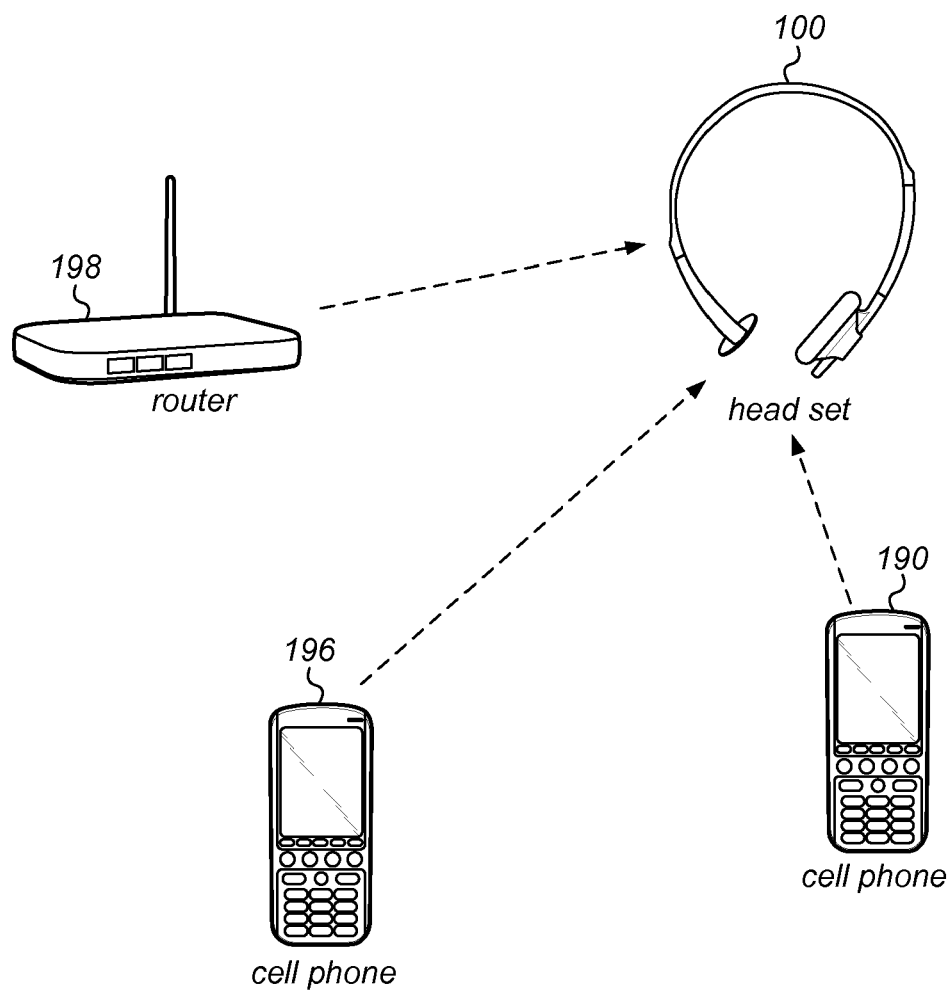
FIG. 1 illustrates various exemplary wireless devices interacting, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

FIG. 1—Exemplary Wireless Devices and Interaction Therebetween

FIG. 1 illustrates a variety of exemplary wireless devices and one possible set of interactions between those wireless devices, according to one embodiment. The various wireless devices shown in FIG. 1 are examples of a few of numerous different possible wireless devices. Examples of wireless devices could include portable computers and other mobile computing devices, wireless computer peripheral devices such as wireless keyboards and mice, cell phones (including smart phones), personal digital assistants, multimedia players (portable or stationary), routers, and/or other mobile devices/computing systems which are operable to use wireless communication.

Different wireless devices may be capable of operating using one or more wireless protocols. For example, two common wireless protocols include Bluetooth and IEEE 802.11/WLAN (also referred to as Wi-Fi). In addition, cordless telephones, such as those operating according to the DECT standard, represent another type of wireless communication. Each wireless communication method may differ from the others in various ways. As one example, Bluetooth is generally considered a "narrowband" wireless communication technology, in that Bluetooth devices communicate on channels that are 1 MHz wide, while Wi-Fi is generally considered a "wideband" wireless communication technology, in that Wi-Fi devices communicate on much wider 22 MHz channels.

The term "channel" as used herein is presumed to have its ordinary accepted meaning, e.g., a medium used to convey information from a sender (transmitter) to a receiver. It should be noted that since the definition of the term "channel" may differ according to different wireless standards, the term "channel" as used herein should be considered as being used in a manner that is consistent with the standard of the type of device with reference to which the term is used. For example, if used in reference to a Bluetooth device, the term "channel" would refer to a 1 MHz band defined as a channel by the Bluetooth standard. If used in reference to a device that utilizes a second standard, the term "channel" would be used according to the definition of the term according to the second standard, or according to an equivalent term according to the second standard if the second standard does not define the term "channel".

Wireless devices may be capable of transmitting, receiving, or both transmitting and receiving wireless signals. In addition, wireless devices may be configured, or may be capable of being configured, to operate using signals in one or more bandwidth ranges. For example, a band used commonly by a variety of wireless devices is the unlicensed 2.4 GHz ISM frequency band. Because this band is used commonly by a variety of devices, it is possible for devices to attempt to use the same frequency at the same time within range of one another in a conflicting manner, potentially causing noise and/or interference between the devices, including in some cases different types of devices which utilize different wireless protocols.

In FIG. 1, four exemplary wireless devices are shown: wireless router 198, cell phones 190, 196, and head set 100. Consider a situation in which headset 100 and cell phone 190 are communicating via a Bluetooth connection on the 2.4 GHz band. In particular, consider the case in which cell phone 190 is acting as a transmitter and head set 100 is acting as a receiver, as indicated by the dashed arrow between cell phone 190 and head set 100. As part of the Bluetooth connection, cell phone 190 and headset 100 may have determined a set of available channels, e.g., based on a background scan, and may accordingly be following an agreed upon frequency hopping pattern that utilizes that particular set of channels. This set of channels may exclude any channels in which significant background noise or interference is detected; for example, if a wireless wideband transmitter (e.g., wireless router 198, a Wi-Fi device) is transmitting on a portion of the band, this portion of the band may be excluded from the set of available channels.

If a wireless wideband transmitter is not within range of cell phone 190 and head set 100 at the time of the background scan, but later comes within range (e.g., due to movement of a user of cell phone 190 and head set 100) of cell phone 190 and head set 100, this may become a persistent source of interference (or noise) on one or more channels being used by cell phone 190 and head set 100. For example, if wireless router 198 is transmitting on a channel being used by cell phone 190 and head set 100, head set 100 may receive this signal (as indicated by the dashed line between router 198 and head set 100) as noise when attempting to receive a signal from cell phone 190 on the channel. If this occurs, it may be desirable for cell phone 190 and head set 100 to discontinue use of the channel.

However, it is also possible for interference to be present on a channel only briefly, e.g., due to a transient transmission on that channel. For example, if a second wireless narrowband transmitter (e.g., such as cell phone 196 communicating via a Bluetooth connection to another Bluetooth device) happens to transmit on a channel as part of its frequency hopping pattern within range of head set 100 at the same time as cell phone 190 is transmitting on the channel as part of its frequency hopping pattern, head set 100 may receive the signal (e.g., a signal transmitted by cell phone 196 as indicated by the dashed line between cell phone 196 and head set 100) as interference. In this case, it may not be desirable for cell phone 190 and head set 100 to discontinue use of this channel, because the interference is not likely to be present the next time the channel is used in the frequency hopping pattern.

Thus, depending on the situation, if interference is detected on a channel that is expected to be available, causing an error in receiving a signal, it may or may not be desirable for devices using a Bluetooth connection to discontinue use of that channel. While it might be possible to determine whether or not that channel should continue to be used by performing a full background scan and re-evaluating the availability of every channel in the band, this is not a desirable solution. Background scans can hurt performance and waste power, and so performing a background scan every time noise causes an error in reception could become a performance and energy drain. In contrast, embodiments of the present disclosure relate to measuring received signal strength of neighboring frequencies of such a channel, which may provide a relatively quick and simple means of determining whether a source of interference (or noise) is a narrowband transmitter or a wideband transmitter. Embodiments of the invention may thus reduce scan time. For example, the method described herein of measuring received signal strength of neighboring frequencies of a channel (also referred to as multiple rotator frequency measurements) may provide increased performance, although it is noted that background scans may still be needed in some situations.

It will of course be recognized that while the example described above and illustrated in FIG. 1 represents one possible situation in which the present disclosure may be advantageously implemented, parts or all of the system and method described herein may be applicable in any number of other situations. Accordingly, the disclosure should not be considered limited to Bluetooth implementations, but should also be considered in the context of other wireless systems.

Figure 2:
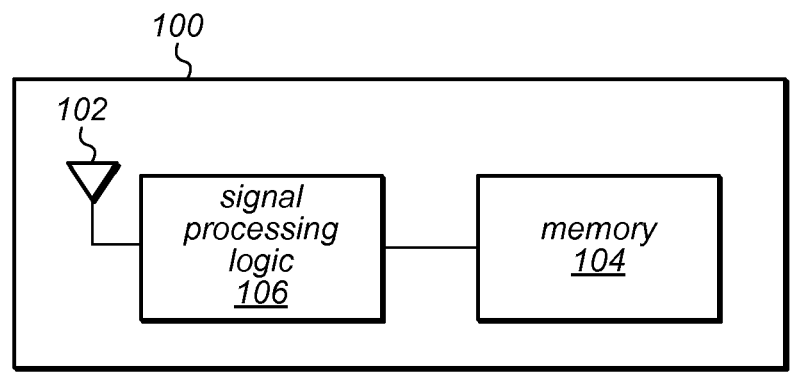
FIG. 2 is an exemplary block diagram of a wireless receiver according to one embodiment.
Figure 3:
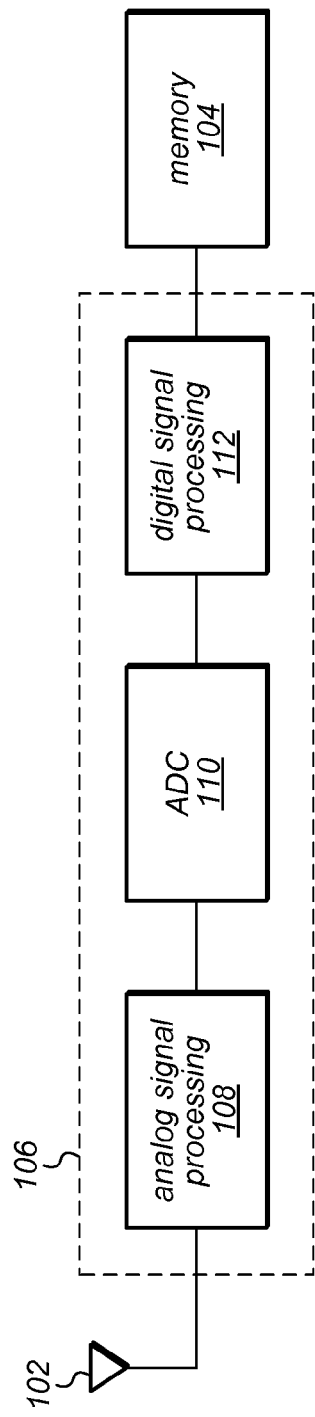
FIG. 3 is a more detailed exemplary block diagram of a wireless receiver, according to one embodiment
Figure 4:
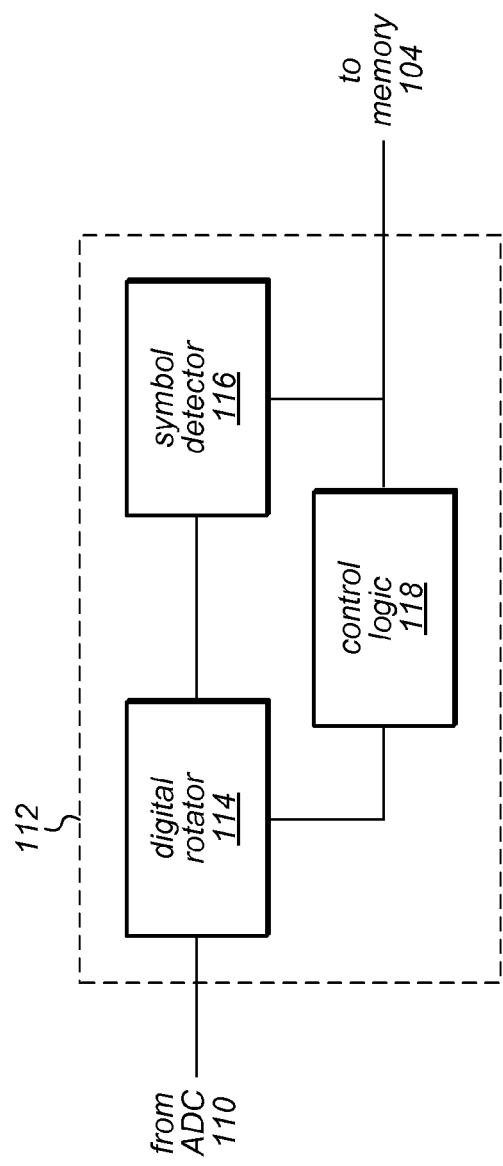
FIG. 4 is an exemplary block diagram of a portion of a wireless receiver according to one embodiment.

FIGS. 2-4—Exemplary Block Diagrams of a Wireless Device

FIGS. 2-4 are block diagrams illustrating exemplary embodiments of a wireless device that could be used to implement the present disclosure according to some embodiments. As will be readily recognized, there are a tremendous number of variations in the way wireless devices may be implemented, and it is beyond the scope of this disclosure to describe in detail such implementations and variations as will be readily apparent to one of skill in the art having the benefit of this disclosure. Accordingly the block diagram illustrations of the Figures are primarily intended to show the components of a wireless device suitable to implement the disclosure in a convenient functional grouping, whereby the system and method described herein may be more readily understood. U.S. patent application Ser. No. 12/016,955, titled "Hybrid Zero-IF Receiver" and incorporated by reference above, provides further details of some exemplary wireless receiver designs, although it should be noted that the systems and examples described therein should not be considered limiting to this disclosure.

As shown in FIG. 2, the wireless device 100 may include an antenna 102 for receiving wireless signals, signal processing logic 106 for extracting information from the received signal, and memory 104 for storing data. The signal processing logic 106 may be implemented in any of various ways, such as analog logic, digital logic, a processor and memory (such as a CPU, DSP, microcontroller, etc.), an ASIC (application specific integrated circuit), an FPGA (field programmable gate array), or any combination of the above.

FIG. 3 is a block diagram illustrating one possible embodiment of the wireless device 100 of FIG. 2 in which the signal processing logic 106 includes analog signal processing logic 108, an analog-to-digital converter (ADC) 110, and digital signal processing logic 112. In other words, in the embodiment shown in FIG. 3, the signal processing logic 106 may be a combination of analog and digital logic. As noted above, other implementations are also possible.

As shown, the analog signal processing portion 108 may receive the signal from the antenna 102. One or more analog signal processing functions may be performed on the received signal by the analog signal processing portion 108. For example, the signal may be amplified, down-converted to an intermediate frequency (IF) or baseband signal, and/or filtered (e.g., using a low-pass filter), among other possible operations, by the analog signal processing logic 108. The analog signal processing logic 108 may pass the signal to the ADC 110, which may convert the analog signal to a digital signal, and pass the signal to the digital signal processing logic 112.

The digital signal processing portion 112 may perform one or more digital signal processing functions on the signal. FIG. 4 shows a simplified block diagram of an exemplary digital signal processing portion 112 of wireless device 100 according to one embodiment. As shown, the digital signal processing logic 112 may include a digital rotator 114, which may be operable to rotate the measured frequency of the received signal, a symbol detector 116, which may be used to correlate the received signal and thus extract the data symbols from the signal, and control logic 118 for controlling operation of the digital signal processing logic 112. According to various embodiments the digital signal processing portion 112 may also include any number of other components, and/or may omit or substitute an alternative component for one or more of the components shown, as desired.

The memory 104 may be used to store any of a variety of types of data. For example, as described in some of the embodiments described below, the memory 104 may be used to store data relating to or based on the signal received by the wireless device, such as received signal strength measurements. The memory may also or alternatively be used to store (e.g., buffer) signal data received by the wireless device. Additionally, memory 104 (or another memory) could be used to store program instructions executable (e.g., by a processor) to perform various functions, e.g., for use in operating the wireless device.

Figure 5:
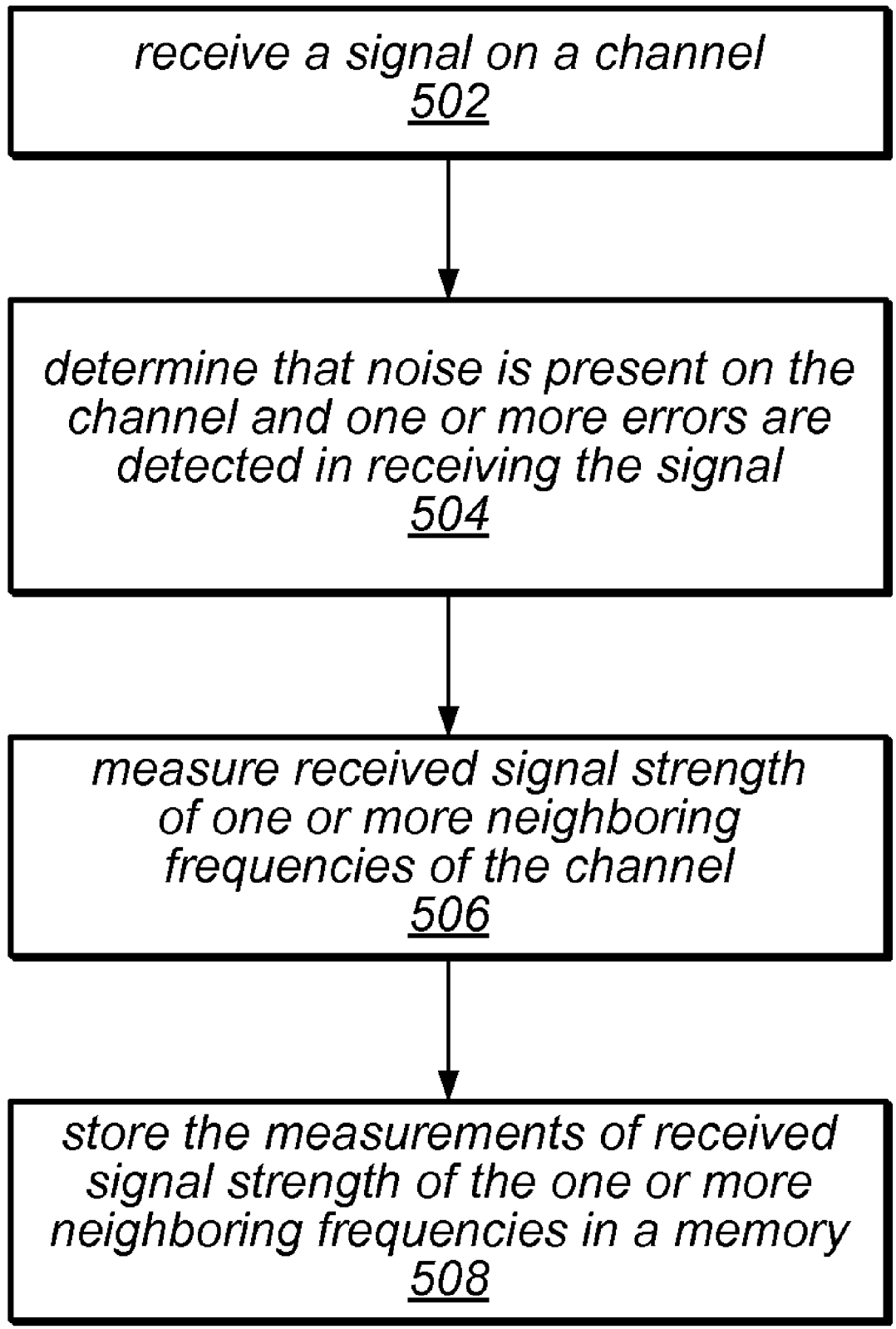
FIG. 5 is a flowchart diagram illustrating a method for operating a wireless receiver according to one embodiment.

FIG. 5—Flowchart Illustrating a Method for Operating a Wireless Receiver

FIG. 5 illustrates one embodiment of a method for operating a wireless device. The method may enable the wireless device to determine a type of a source of interference present on a channel on which the wireless device is attempting to receive communication from another wireless device. The method shown in FIG. 5 may be used in conjunction with any of the wireless devices shown in the above Figures, among other wireless devices. In particular, some embodiments are contemplated in which the method may be used in conjunction with narrowband, frequency hopping wireless devices, such as Bluetooth devices, although the method may also or alternatively be used with other types of wireless devices in some embodiments.

In various embodiments, some of the method elements shown may be performed concurrently, in a different order than shown, or may be omitted. Additional method elements may also be performed as desired. As shown, this method may operate as follows.

In 502, a signal may be received on a channel. The signal may be received by a wireless receiver. At least a portion of the signal may be received from a first wireless transmitter, from which the wireless receiver may be attempting to receive communication. In some embodiments, the wireless receiver may also be capable of transmitting wirelessly; similarly, the first wireless transmitter may also be capable of receiving wirelessly. For example, the wireless receiver and the first wireless transmitter may be communicating bi-directionally via a wireless communication link. For the purposes of this discussion, because only the receiving capability of the wireless receiver and the transmitting capability of the first wireless transmitter may be relevant, the respective devices are referred to as the wireless receiver and the first wireless transmitter respectively.

In some embodiments, the wireless receiver and the first wireless transmitter may be narrowband wireless devices. In some embodiments, the wireless receiver and the first wireless transmitter may implement an adaptive frequency hopping algorithm. For example, the devices may be Bluetooth devices, and the signal transmitted by the first wireless transmitter (which forms at least a portion of the signal received by the wireless receiver) may be a Bluetooth signal. In this case, use of the channel at a particular time by the transmitter and the receiver may have been determined by a mutually known frequency hopping pattern. Embodiments in which the wireless receiver is a different type of wireless receiver are also contemplated.

In some situations, the signal received by the wireless receiver on the channel may be substantially only composed of the signal transmitted by the first wireless transmitter. For example, this may be the case if the wireless receiver and the first wireless transmitter are the only devices communicating on the channel within reception range of the wireless receiver. In such cases, there may be no interference (or very nearly no interference) on the channel. In these situations, there may not be sufficient reason to perform the method in its entirety.

However, it may frequently be the case that there may be one or more other wireless transmitters transmitting on the channel within range of the wireless receiver. In this case, there may be interference on the channel. If the interference is at a sufficient level, the interference (noise) may cause one or more errors in reception of the signal by the wireless receiver. For example, the wireless receiver may not be able to correlate the signal if there is too much noise interfering. Alternatively, the wireless receiver may correlate the signal, but a cyclic redundancy check (CRC) error may be detected, e.g., possibly indicating that part of the signal may have been incorrectly correlated.

PHY errors represent another possible type of error that could occur. In some embodiments, thresholds are set for measurements of various segments or characteristics of the expected packet type. If the measurements of these characteristics fall below the threshold, this is referred to as a PHY error. For example, a certain self-correlation or cross-correlation result may be expected from a preamble section of a packet, and if this result is not achieved, the packet may be aborted with a PHY error, since it is no longer believed that the packet is a valid packet in the protocol.

Of course, in addition to or instead of interference, errors may also be caused by insufficient signal strength of the received signal. Attempting to determine a source of interference on a channel as a means of reducing future errors may be ineffective if the source of an error in receiving the signal on a channel is insufficient signal strength of the desired signal. Thus, in some embodiments, part of the method may include determining that the received signal does have sufficient strength that it should have been received correctly in the absence of interference. Alternatively, other means may be taken to determine that the desired signal has sufficient strength to be received without error, and the method may be concerned merely with determining that there is interference present on a channel, and determining a source of that interference.

Thus, in 504, it may be determined that interference is present on the channel and one or more errors are detected in receiving the signal. In some embodiments, determining that interference is present on the channel may actually include determining that received signal strength on the channel is above a first threshold in combination with detecting the one or more errors in receiving the signal. For example, if the received signal strength is above a certain level, this may indicate that there should be sufficient signal strength to receive the signal without error. If one or more errors are detected despite sufficient signal strength, this may be indicative of interference on the channel.

Different wireless systems may use different indicia to measure received signal strength. As one example, Bluetooth devices may determine a "received signal strength indication" (RSSI) as a measure of the strength of a received signal. Thus, in some embodiments, determining received signal strength on a channel may include taking an RSSI measurement, and the first threshold may be a particular RSSI value. Other received signal strength indicators are also contemplated.

According to various embodiments, the actual received strength threshold (e.g., the first threshold) that is indicative of sufficient signal strength for a given wireless device may depend on any number of factors, including the wireless communication system, the type of device, and of course the received signal strength index used. It will be noted that other means of determining that interference is present on the channel may also or alternatively be used, which may or may not rely on received signal strength measurements.

In 506, received signal strength of one or more neighboring frequencies of the channel may be measured. The received signal strength of the one or more neighboring frequencies of the channel may be measured in response to determining that interference is present on the channel and one or more errors are detected in receiving the signal. Measuring the received signal strength of the one or more neighboring frequencies of the channel may provide a simple means of determining whether the source of interference is a wireless wideband transmitter or a second wireless narrowband transmitter. For example, if the source of interference is a second wireless narrowband transmitter whose signal's width is a single channel, the interference should only be present on the channel, and received signal strength measurements of neighboring frequencies of the channel should indicate a lower received signal strength. On the other hand, if the source of interference is a wireless wideband transmitter, the interference may be present on the neighboring frequencies of the channel as well. The received signal strength measurements of neighboring frequencies of the channel may provide an indication of this as well.

There may be a variety of ways to measure received signal strength of neighboring frequencies of the channel. In one set of embodiments, utilizing a rotator to rotate the measured frequency of the received signal is contemplated. In some wireless devices, a rotator (e.g., a digital rotator) may be used by default to rotate the frequency for a low IF signal. The rotator may, for example, normally operate to rotate the measured frequency by some fixed frequency amount in order to receive the signal on a desired channel; the fixed frequency amount might be 700 kHz, or any other amount, according to various embodiments. In some embodiments. rotation of the measured frequency may include positive or negative multiples of the default rotator frequency.

This capability may thus in some embodiments be leveraged to make received signal strength measurements of neighboring frequencies of the channel. For example, the measured frequency of the received signal could be rotated one or more times, in the forwards or backwards direction, for each measurement of a neighboring frequency of the channel. Thus, if the rotator operates in increments of 700 kHz, received signal strength measurements could be taken at +/−700 kHz, +/−1400 kHz, +/−2100 kHz, etc., simply by modifying the sign and number of steps through the rotator waveform. This may provide a relatively quick means of measuring received signal strength of neighboring frequencies of a channel, particularly as it may not require that the synthesizer be changed to do so.

In another set of embodiments, utilizing a frequency domain transform to measure the received signal strength of the one or more neighboring frequencies of the channel is contemplated. Some wireless devices may implement a frequency domain transform, such as a Fast Fourier Transform (FFT), to the received signal as part of their signal processing. In such implementations, it may be possible to simply measure the received signal strength of the desired neighboring frequencies of the channel from the frequency domain transformed signal.

Although rotator and frequency domain transform based techniques may represent relatively quick and simple implementations of techniques for measuring received signal strength of neighboring frequencies of the channel, it will of course be recognized that any number of other techniques may be used instead of or in addition to such techniques.

In 508, the measurements of received signal strength of the one or more neighboring frequencies may be stored in a memory. As previously mentioned, the measurements may be used to determine if a source of interference on the channel is a wireless wideband transmitter or a second wireless narrowband transmitter. For example, the wireless device may have logic (e.g., hardware logic, or software, or some combination thereof) that reads the measurements from the memory and determines whether the source of interference on the channel is a wireless wideband transmitter or a second wireless narrowband transmitter based partially or entirely on the measurements.

According to various embodiments, the wireless device may then make one or more adjustments in its operation depending on the determined source of interference. For example, if the wireless receiver is a Bluetooth receiver operating on the 2.4 GHz band and the source of interference is determined to be a wireless narrowband transmitter, it may be likely that the source of interference is a second Bluetooth transmitter. In this case, since the Bluetooth transmitter which is communicating with the wireless receiver and the second Bluetooth transmitter will almost certainly be using different frequency hopping patterns, the interference may be incidental and the channel may still be considered available for use by the Bluetooth receiver and the Bluetooth transmitter with which it is communicating. On the other hand, if such a Bluetooth receiver operating on the 2.4 GHz band determines that the source of interference is a wireless wideband transmitter, it may be likely that the source of interference is a WiFi transmitter. In this case, the WiFi transmitter may be likely to continue to transmit on the channel and accordingly may be expected to be a persistent source of interference on the channel. Thus, the Bluetooth receiver may determine that the channel should no longer be used, and may adjust its frequency hopping pattern to avoid that channel.

It will be understood that the above example of the Bluetooth receiver operating on the 2.4 GHz band is merely representative of one possible interpretation and use of the information obtained by the method described herein. According to various embodiments, knowledge of the type of interference source (e.g., whether the source is a wireless narrowband transmitter or a wireless wideband transmitter) may also or alternatively be used by other types or wireless devices, and/or may be used in any number of other ways, as desired.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a wireless narrowband receiver, comprising:
- receiving a signal on a channel of the wireless narrowband receiver, wherein at least a portion of the signal is received from a first wireless narrowband transmitter, wherein the wireless narrowband receiver implements an adaptive frequency hopping algorithm;
- determining if interference is present on the channel and one or more errors are detected in receiving the signal;
- in response to determining that interference is present on the channel and one or more errors are detected in receiving the signal:
  - measuring received signal strength of one or more neighboring frequencies of the channel;
  - storing the measurements of received signal strength of the one or more neighboring frequencies in a memory;
- wherein the measurements are used to determine if a source of interference on the channel is a wireless wideband transmitter or a second wireless narrowband transmitter.

2. The method of claim 1, wherein the one or more errors comprise one or more of:
- not correlating the received signal;
- a cyclic redundancy check (CRC) failure;
- a PHY error.

3. The method of claim 1,
- wherein the wireless narrowband receiver includes a rotator operable to rotate a measured frequency of the received signal;
- wherein said measuring received signal strength of one or more neighboring frequencies of the channel comprises using the rotator to rotate the measured frequency of the received signal to the one or more neighboring frequencies of the channel.

4. The method of claim 1,
- wherein the wireless narrowband receiver includes a rotator operable to rotate a measured frequency of the received signal by a first frequency amount;
- wherein said measuring received signal strength of one or more neighboring frequencies of the channel comprises, for each respective neighboring frequency of the one or more neighboring frequencies of the channel:
  - rotating a measured frequency of the received signal by the first frequency amount one or more times, thereby rotating the measured frequency to the respective neighboring frequency;
  - measuring the received signal strength of the respective neighboring frequency.

5. The method of claim 1,
- wherein said measuring received signal strength of one or more neighboring frequencies of the channel comprises applying a frequency domain transform to the received signal.

6. The method of claim 1,
- wherein said measuring received signal strength of one or more neighboring frequencies of the channel comprises:
  - applying a frequency domain transform to the received signal;
  - measuring received signal strength of the one or more neighboring frequencies of the channel from the frequency domain transformed signal.

7. The method of claim 1,
- wherein said measuring received signal strength of one or more neighboring frequencies of the channel is not performed if interference is not present on the channel or no errors are detected in receiving the signal.

8. The method of claim 1,
- wherein the wireless narrowband receiver is a Bluetooth receiver.

9. The method of claim 1,
- wherein determining if interference is present on the channel comprises determining if received signal strength on the channel is above a first threshold and one or more errors are detected in receiving the signal.

10. A wireless narrowband receiver, comprising:
- an antenna for receiving a signal on a channel of the wireless narrowband receiver, wherein at least a portion of the signal is received from a first wireless narrowband transmitter, wherein the wireless narrowband receiver implements an adaptive frequency hopping algorithm;
- signal processing logic coupled to the antenna, wherein the signal processing logic is configured to receive the signal from the antenna, wherein the signal processing logic is configured to:
  - determine if interference is present on the channel and one or more errors are detected in receiving the signal;
  - measure received signal strength of one or more neighboring frequencies of the channel in response to a determination that interference is present on the channel and one or more errors are detected in receiving the signal;
- a memory, coupled to the signal processing logic, for storing the measurements of received signal strength of the one or more neighboring frequencies;
- wherein the measurements are used to determine if a source of the interference is a wireless wideband transmitter or a second wireless narrowband transmitter.

11. The wireless narrowband receiver of claim 10, wherein the one or more errors comprise one or more of:
- not correlating the received signal;
- a cyclic redundancy check (CRC) failure;
- a PHY error.

12. The wireless narrowband receiver of claim 10,
- wherein the signal processing logic comprises a rotator operable to rotate a measured frequency of the received signal;
- wherein the signal processing logic configured to measure received signal strength of one or more neighboring frequencies of the channel uses the rotator to rotate the measured frequency of the received signal to the one or more neighboring frequencies of the channel.

13. The wireless narrowband receiver of claim 10,
- wherein the signal processing logic comprises a rotator operable to rotate a measured frequency of the received signal by a first frequency amount;
- wherein the signal processing logic configured to measure received signal strength of one or more neighboring frequencies of the channel, for each respective neighboring frequency of the one or more neighboring frequencies of the channel, is configured to:
  - rotate, using the rotator, a measured frequency of the received signal by the first frequency amount one or more times, thereby rotating the measured frequency to the respective neighboring frequency;
  - measure the received signal strength of the respective neighboring frequency.

14. The wireless narrowband receiver of claim 10,
wherein the signal processing logic configured to measure received signal strength of one or more neighboring frequencies of the channel applies a frequency domain transform to the received signal.

15. The wireless narrowband receiver of claim 10,
wherein the signal processing logic configured to measure received signal strength of one or more neighboring frequencies of the channel applies a frequency domain transform to the received signal and measures received signal strength of the one or more neighboring frequencies of the channel from the frequency domain transformed signal.

16. The wireless narrowband receiver of claim 10,
wherein the wireless narrowband receiver does not measure received signal strength of one or more neighboring frequencies of the channel if interference is not present on the channel or no errors are detected in receiving the signal.

17. The wireless narrowband receiver of claim 10,
wherein the wireless narrowband receiver is a Bluetooth receiver.

18. The wireless narrowband receiver of claim 10,
wherein the signal processing logic configured to determining if interference is present on the channel is configured to determine if received signal strength on the channel is above a first threshold and one or more errors are detected in receiving the signal.

19. A method for operating a wireless receiver,
receiving a signal on a channel of the wireless receiver, wherein at least a portion of the signal is received from a first wireless transmitter,
determining if interference is present on the channel of the wireless receiver and the received signal is uncorrelated;
in response to determining that interference is present on the channel of the wireless receiver and the received signal is uncorrelated, measuring received signal strength of one or more neighboring frequencies of the channel;
storing the measurements of received signal strength of the one or more neighboring frequencies in a memory;
wherein the measurements are used to determine the source type of the interference.

20. The method of claim 19,
wherein the wireless receiver includes a rotator operable to rotate a measured frequency of the received signal;
wherein said measuring received signal strength of one or more neighboring frequencies of the channel comprises using the rotator to rotate the measured frequency of the received signal to the one or more neighboring frequencies of the channel.

21. The method of claim 19,
wherein said measuring received signal strength of one or more neighboring frequencies of the channel comprises applying a frequency domain transform to the received signal.

22. The method of claim 19,
wherein said measuring received signal strength of one or more neighboring frequencies of the channel is not performed if interference is not present on the channel of the wireless receiver or the received signal is correlated.

* * * * *